Feb. 14, 1961 J. P. SCHAFER 2,972,122

NONRECIPROCAL WAVE TRANSMISSION

Filed April 25, 1958

INVENTOR
J. P. SCHAFER
BY Roy M. Porter, Jr.
ATTORNEY 2,972,122
Patented Feb. 14, 1961

2,972,122

NONRECIPROCAL WAVE TRANSMISSION

John P. Schafer, Elberon, N.J., assignor to Bell Telephone Laboratories, Incorporated, New York, N.Y., a corporation of New York Filed Apr. 25, 1958, Ser. No. 731,037

5 Claims. (Cl. 333—73)

This invention relates to electrical transmission systems and more particularly to a narrow band isolator or nonreciprocal frequency selective attenuator for use in said systems.

An isolator is defined as a circuit element which may be employed to isolate an electromagnetic device from other portions of an electromagnetic wave system, in the sense that waves may be freely transmitted in the direction from the device through the isolator to the system, designated the forward direction, whereas waves originating outside of the device, and traveling in the opposite direction, designated the reverse direction, are attenuated by the isolator to the extent required to prevent any deleterious reaction of the system upon the device to be isolated.

In an article entitled "Behavior and Application of Ferrites in the Microwave Region" by A. G. Fox, S. E. Miller and M. T. Weiss, published in the Bell System Technical Journal, volume 34, January 1955, pages 5–103, there are described a number of different types of isolators. One of the various types has been classified as a resonance isolator and comprises a rectangular ferrite slab asymmetrically located in a transmission path and biased to gyromagnetic resonance, the biasing field being directed parallel to the electric vectors of the propagating wave energy. While resonance isolators perform satisfactorily, they do require relatively high magnetic biasing fields to produce gyromagnetic resonance and the resulting resonance bands are generally too broad to be employed in any practical application requiring a frequency selective characteristic. It has been discovered, however, that certain configurations of the magnetic biasing field will produce sharp frequency selective nonreciprocal attenuation in a new and novel manner, thus giving rise to a distinctly new class of isolator. These attenuation effects occur at biasing fields which are a fraction of the field strengths required to produce ordinary ferromagnetic resonance. The nulls produced are extremely narrow, and may be moved across the frequency band several hundred megacycles by varying the strength of the biasing field. Because of the highly selective nature of the attenuation characteristic, such devices may be used as band elimination filters with the added advantage of having the rejected band completely absorbed within the filter rather than reflected, thus eliminating the need for separate and additional attenuation or decoupling networks to remove the reflected wave energy. Isolators constructed in accordance with the teachings of the present invention act as constant resistance, nonreciprocal band elimination filters.

It is, therefore, a broad object of the invention to introduce an attenuation to electromagnetic wave energy that is highly selective both as to the direction of propagation of said energy and to its frequency.

The operation of the present invention is based on phenomena which, by their operation, tend to minimize some of the disadvantages of the prior art isolators and in turn present advantages not found in said prior art.

One of these phenomena is called "cutoff" and can be described as that property of wave guides which makes possible the free propagation of wave energy above a certain frequency, known as the "cutoff frequency" and no propagation below this frequency. The phenomenon can be better understood by considering a wave as being composed of plane wave components which are directed, not along the axis of the guide, but at an angle to the guide walls (see "Principles and Applications of Waveguide Transmission," by G. Southworth, page 171). These plane waves or "rays" are reflected by the walls and combine in the interior of the guide to form the required wave configuration. At frequencies far above cutoff, these rays are incident on the guide walls at a small angle. As cutoff is approached, however, this angle becomes increasingly larger until, exactly at cutoff, the rays are directed at right angles to the guide walls. Under these conditions there is no wave propagation along the guide, the rays being reflected back and forth between the guide walls at the same point at which they are excited. This cutoff condition can be considered quasi-resonant in that these multiple transverse reflections are similar in many respects to the longitudinal reflections which take place between conductive obstacles displaced longitudinally in a waveguide. If now the waveguide is rendered lossy at the cutoff wavelength, the multiple reflected energy at and about cutoff will be dissipated.

The frequency of cutoff is a function of the actual mode or wave configuration of the energy within the guide. That is, for any particular mode, the cutoff wavelength is a function of the electrical dimension of the guide.

The foregoing principles may be applied to a wave transmission system in the following manner. Dominant mode wave energy propagating along a transmission path enters a region of the path in which the energy is converted to a higher order mode. The region, however, is both at cutoff for such higher order mode and lossy. As a consequence, the wave energy is dissipated and the wave path has a high attenuation constant at that frequency. By converting all the incident energy to the appropriate higher order mode, an efficient constant impedance attenuator may be realized. Where a broad band of frequencies is transmitted, only that portion of the band near cutoff will be attenuated, the loss characteristic having the appearance of a narrow band resonance curve.

It has been discovered that highly efficient mode conversion may be obtained by the application of two mutually perpendicular magnetizing fields to a ferrite element. Maximum conversion will occur when the relative field strength of the two biasing fields bear a particular relationship to each other. Variations in the relative field strengths about this optimum value will reduce the degree of conversion and thus afford a means for controlling the attenuator. It has also been discovered that when subjected to the above described field configuration, the ferrite is lossy to the higher order modes so as to produce the desired dissipation at the cutoff frequency.

It is, therefore, an object of this invention to convert wave energy to a higher order mode in a wave path proportioned to be near cutoff for such higher order mode.

It is an additional object of this invention that the wave path be lossy at the cutoff frequency of said higher order mode.

Since, in an isolator, the attenuation is high in only one direction of propagation, and low in the other direction, it is a further object of this invention that said mode conversion be nonreciprocal.

It is a further object of this invention to produce nonreciprocal attenuation effects with reduced magnetic biasing fields.

In accordance with the present invention, a hollow, conductively bound, rectangular waveguide, proportioned to support the dominant $TE_{10}$ mode, is loaded by a ferrite slab placed against one of the narrow walls of the waveguide. The transverse dimension of the ferrite, its permeability and its dielectric constant are chosen with respect to the wide dimension of the guide so as to be at cutoff for the $TE_{20}$ mode at some preselected frequency. The relationship among these several parameters will be given in greater detail hereinafter. A magnetic biasing field is applied to the ferrite slab transverse to the guide axis, and at an oblique angle to the electric field vectors of the dominant mode wave energy. At this angle the biasing field may be regarded as being composed of two mutually perpendicular components, one parallel to the electric field vectors and a second perpendicular thereto. The angle at which the biasing field is applied is adjusted so as to maintain the relative field strengths of the two components within predescribed limits. The resultant intensity of the magnetizing field is a fraction of that required to produce gyromagnetic resonance. Such a structure will present a high impedance to a narrow band of frequencies and may be used in those applications requiring a one-way band-eliminating filter. In the low impedance direction, the attenuation is small and is substantially constant.

Because the loss characteristic produced by the present invention has the appearance of a narrow band resonance curve, the frequency at which maximum attenuation occurs will be referred to hereinafter as the "resonant frequency." However, this term should not be confused with the term "gyromagnetic resonance," the primary condition associated with the prior art resonance isolators.

These and other objects, the nature of the present invention, and its various features and advantages, will appear more fully upon consideration of the various specific illustrative embodiments shown in the accompanying drawings and analyzed in the following detailed description of these drawings.

Figure 1:
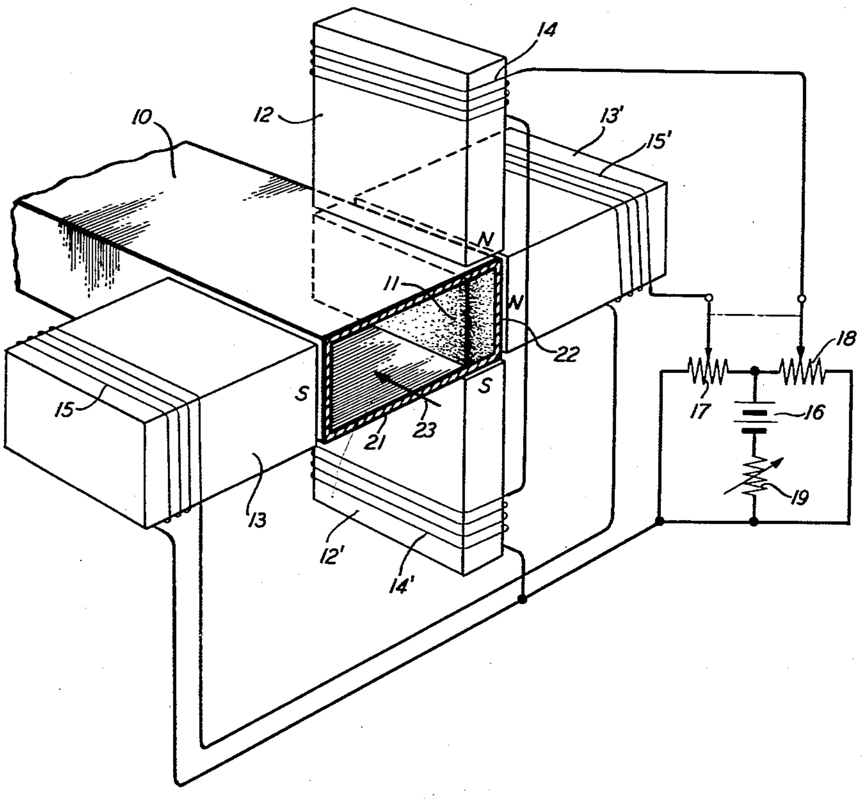
Fig. 1 is a perspective view of the isolator and its controls embodying the principles of the present invention.

Referring to the accompanying drawings, and more specifically to Fig. 1 there is shown an isolator in accordance with the present invention. The isolator comprises a section of hollow, conductively bound, rectangular wave guide 10, having a wide internal cross-sectional dimension 21 of at least one-half wavelength of the wave energy to be conducted thereby, and a narrow dimension 22 substantially one-half of the wide dimension. So constituted, this waveguide will support wave energy in the dominant $TE_{10}$ mode only, in which the electric lines of force extend from the bottom to the top of the waveguide, perpendicular to the wide guide walls. Asymmetrically located within guide 10, parallel to narrow wall 22, is a vane or septum of gyromagnetic material 11. This material is, for example, of the type having electrical and magnetic properties similar to those derived from the mathematic analysis of D. Poder in Philosophique Magazine, January 1949, vol. 40, pages 99 through 115. As a specific example, element 11 may be made of nickel-zinc ferrite prepared in the manner described in the publication of C. L. Hogan, "The Microwave Gyrator" in the Bell System Technical Journal of January 1952. The ends of element 11 may be tapered (not shown) to prevent undue reflections of wave energy therefrom.

As illustrated in Fig. 1, element 11 extends across the height of guide 10, and extends longitudinally therein approximately one and one-half to two wavelengths. The width or thickness of element 11 is chosen in relation to the guide width 21 as will be explained hereinafter.

Element 11 is biased by a steady, though variable, magnetic field, of a strength to be described, at right angles to the direction of propagation of the wave energy in guide 10. This field may be supplied, as shown in Fig. 1, by solenoids 14, 14′, 15 and 15′ containing magnetic core pieces 12, 12′, 13 and 13′, respectively. The magnetic core pieces bear against the wide and narrow walls of the guide in the region coextensive with element 11.

Solenoids 14 and 14′ are serially connected to generate a magnetic field component extending in a direction parallel to the electric field vectors associated with the dominant mode wave energy propagating in guide 10. The two coils 14 and 14′ are connected through potentiometer 18 and rheostat 19 to a source of magnetizing current 16. In like fashion, solenoids 15 and 15′ are serially connected to generate a magnetic field component extending in a direction perpendicular to the electric field vectors in guide 10. The two coils 15 and 15′ are connected through potentiometer 17 and rheostat 19 to source 16.

Figure 2:
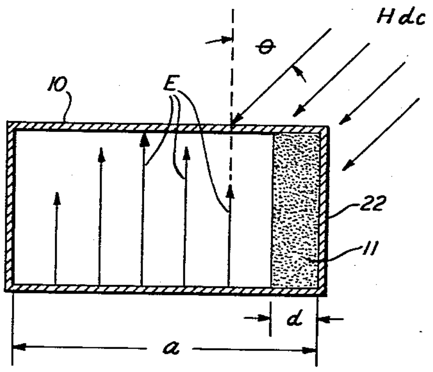
Fig. 2 is a diagram, by way of explanation, illustrating the relative directions of the fields and the relative dimensions of the guide and gyromagnetic material.

When energized, the two mutually perpendicular magnetizing field components produce a resultant field which is oblique to the electric field vectors. This is illustrated in Fig. 2, where the direction of the resultant magnetizing field, $H_{dc}$, is shown at an angle $\theta$ to the direction of the electric lines of force E. The relative strength of the fields produced by coils 15 and 15′ and by coils 14 and 14′ are adjusted to be in the ratio of about 0.7 to 1. This ratio is obtained when the resultant field, $H_{dc}$, is directed at about 35 degrees to the electric field vectors, at which angle the attenuation produced is a maximum. As the direction of the resultant field is varied about 35 degrees, the attenuation decreases. This may be done by simultaneously increasing and decreasing the current in the two sets of coils, either individually, or by ganging potentiometers 17 and 18 as shown in Fig. 1. When properly ganged, the magnitude of the resultant field can be made to be substantially constant regardless of angle $\theta$. The field may then be varied independently by changing the resistance of rheostat 19 in series with source 16. The effects produced by altering the angle and amplitude of the biasing field will be explained in greater detail below. These fields may alternatively be supplied by electric solenoids with magnetic cores of other suitable physical design, by solenoids without cores, by permanent magnetic structures, or element 11 may be permanently magnetized if desired. Changes in the field direction may be obtained by physically rotating the field pieces, while changes in field intensity may be obtained by varying the distance between opposite pole faces.

Any material medium which propagates electromagnetic disturbances possesses a local electric or magnetic configuration and it is the motion of the electric or magnetic carriers under the influence of the disturbing fields that determines how the propagation takes place. If a direct-current magnetic field is applied to the medium, one may expect the local response to be altered and, consequently, to find changes in the character of the propagation. Gyromagnetic media are those for which such changes are sufficiently large to be experimentally significant. For very small pieces of ferrite, the field configuration may be assumed not to be appreciably altered by the addition of the ferrite. This approximation is reasonably adequate and leads to correct conclusions as to the general nature of the effects resulting from the addition of biased ferrite. However, in systems employing larger ferrite elements, rigorous analysis becomes extremely complicated and involved. For the sake of brevity and simplicity, therefore, a mathematical analysis is omitted here and the following quantitative explanation, based upon observations and experimentation, is offered in its stead.

When ferrite is added to a hollow, bounded waveguide as shown in Figs. 1 and 2, the relatively high dielectric constant of the ferrite makes the waveguide medium capable of propagating secondary modes. Calculations have been made to determine the conditions for cut-off of the $TE_{20}$ mode in a rectangular waveguide for several locations of the ferrite in the guide. The results of these calculations are graphically shown in the publication by A. G. Fox et al. cited earlier. The relation between the guide width $a$ and the width $b$ of element 11, when element 11 is located contiguous to narrow wall 22, is given as $$\sqrt{\epsilon}\tan 2\pi\left(\frac{a}{\lambda_0}-\frac{d}{\lambda_0}\right)=-\tan\sqrt{\epsilon}2\pi\frac{d}{\lambda_0} \qquad (1)$$

where $\epsilon$ is the dielectric constant of element 11, and $\lambda_0$ is the free space cutoff wavelength for the $TE_{20}$ mode. This assumes that the relative permeability of the ferrite is unity (the field-free condition).

Now, if the ferromagnetic material 11, in guide 10 is magnetized by a transverse biasing field, at an angle oblique to the electric field vectors, coupling between the dominant $TE_{10}$ mode and the higher order $TE_{20}$ mode is effectuated. The magnetized material may be likened to a matching device for matching the $TE_{10}$ mode in the unloaded waveguide to the $TE_{20}$ mode in the loaded portion of the transmission path. Being asymmetrically located with respect to the guide axis, however, matching occurs for only one direction of propagation along the path and not in the reverse direction. The phenomenon of nonreciprocity is related to the dissimilar effects produced by gyromagnetic materials under the influence of oppositely rotating circularly polarized magnetic fields. Thus, for propagation in the direction indicated by arrow 23 in Fig. 1, the wave energy will have a clockwise rotating magnetic field as viewed in element 11 in the direction from the N to the S pole of the resulting biasing field, and there will be a high degree of mode conversion and, because the ferrite is simultaneously lossy for the higher order mode, a correspondingly high level of attenuation. Conversely, for transmission in the opposite direction, the wave polarization in element 11 will be counter-clockwise and there will be substantially no mode conversion and consequently no attenuation. As indicated in Equation 1, the cut-off frequency for the $TE_{20}$ mode is a function of the guide width, the width of the gyromagnetic material and the dielectric constant. Increasing any, or all of these variables has the effect of lowering the cut-off frequency or the so-called "resonant frequency" and consequently lowering the frequencies included in the attenuation band. There are, however, secondary effects which affect the resonant frequency. Thus, for example, when the length of element 11 is less than about one and one-half wavelengths, the resonant frequency increases. For lengths greater than one and a half wavelengths, the resonant frequency is substantially constant.

Equation 1, it will be recalled, assumes that the permeability constant is unity. However, upon the application of a biasing field this will vary somewhat and must be considered in the design of the isolator. Equation 1 may be rewritten as $$\sqrt{\epsilon\mu}\tan 2\pi\left(\frac{a}{\lambda_0}-\frac{d}{\lambda_0}\right)=-\tan\sqrt{\epsilon\mu}2\pi\frac{d}{\lambda_0} \qquad (2)$$

where $\mu$ is the effective directional permeability. Thus, varying the field intensity by means of rheostat 19, affords a convenient means of causing small vernier adjustments in the resonant frequency, since the change in $\mu$ over the region of operation is small.

The degree of attenuation, or the depth of the null produced, was found to be a function of the direction of the biasing field. Maximum attenuation occurred when the biasing field made an angle of about 35 degrees with the electric field vectors. As the biasing field is rotated about this optimum position, the depth of the null decreases, the frequency of the null remaining substantially constant. Thus, by adjusting potentiometers 17 and 18, and rheostat 19, the attenuation and frequency of the isolator may be conveniently varied.

The range of biasing fields used is approximately one-third of that required for gyromagnetic resonance. This requirement appreciably reduces the power-requirements and hence the size of the energizing circuits. At this reduced field, the attenuation band produced is considerably narrower than the attenuation band obtained at gyromagnetic resonance by as much as a factor of 40 to one, depending upon the material used.

The presence of second order modes has been verified by mapping the E field by means of a small wire probe. These measurements definitely showed the presence of the $TE_{20}$ mode as indicated by the double sinusoid at the cut-off frequency and above. Below cut-off, no such indications were observed, although some distortion of the true $TE_{10}$ mode existed. In all cases for transmission in the low attenuation direction, no signs of the $TE_{20}$ mode was found.

In all cases, it is understood that the above-described arrangements are simply illustrative of a small number of the many possible specific embodiments which can represent the applications of the principles of this invention. Numerous and varied other arrangements can readily be devised in accordance with these principles by those skilled in the art without departing from the spirit and scope of the invention.

What is claimed is:

1. A nonreciprocal microwave filter comprising a section of conductively bounded rectangular waveguide having pairs of opposed broad and narrow walls, a source of dominant mode wave energy having a frequency spectrum extending from a first frequency $f_1$ to a second frequency $f_2$ and having a third frequency $f_3$ therebetween applied to one end of said section, output means for utilizing said applied wave energy to the exclusion of a band of frequencies centered about said frequency $f_3$ connected to the other end of said section, means for attenuating said band of frequencies including an elongated element of gyromagnetic material asymmetrically located within said waveguide between one of said narrow walls and the center of said waveguide with the long dimension thereof extending longitudinally along said waveguide parallel to said walls and with the short dimensions thereof extending transversely within said waveguide parallel to said walls, and means for magnetically polarizing said element in a direction transverse to the longitudinal axis of said waveguide and at a substantially oblique angle to said waveguide walls.

2. The combination according to claim 1 wherein said means for magnetically polarizing said element comprises a first biasing means for magnetically polarizing said element in a direction perpendicular to said narrow walls and a second biasing means for magnetically polarizing said element in a direction perpendicular to said wide walls, said first biasing means and said second biasing means producing field intensities in the ratio of approximately 0.7 to 1 and means for varying said ratio.

3. The combination according to claim 1 wherein said angle is approximately 35 degrees with respect to the narrow walls.

4. The combination according to claim 1 wherein said element is located contiguous to one of said narrow walls.

5. A nonreciprocal attenuator for electromagnetic wave energy comprising a section of conductively bounded rectangular waveguide having wide and narrow walls, a source of dominant mode wave energy having frequency components within a given band of frequencies extending from a first frequency $f_1$ to a second higher frequency $f_2$ and having a third frequency $f_3$ therebetween applied to one end of said section, means for utilizing said wave energy to the exclusion of a band of frequencies about said frequency $f_3$ connected to the other end of said section, said section being below cutoff for all higher order modes of wave propagation within said band of frequencies, an elongated element of gyromagnetic material located between the guide axis and one of said narrow walls extending along a longitudinal region of said waveguide and proportioned to reduce the cutoff frequency for said higher order modes in said region to approximately said frequency $f_3$, and means for converting said band of frequencies about said frequency $f_3$ to a higher order mode within said region comprising a magnetic biasing field applied to said element at an oblique angle to said waveguide walls, the said band of frequency being attenuated within said element.

References Cited in the file of this patent

UNITED STATES PATENTS

| | | |
|---|---|---|
| 2,532,157 | Evans | Nov. 28, 1950 |
| 2,802,183 | Read | Aug. 6, 1957 |
| 2,849,683 | Miller | Aug. 26, 1958 |

FOREIGN PATENTS

| | | |
|---|---|---|
| 674,874 | Great Britain | July 2, 1952 |

OTHER REFERENCES

Weiss: Physical Review, vol. 107, No. 1, July 1, 1957, page 317.

"Modern Advances in Microwave Techniques" (published July 1955), pages 221–224.